(12) United States Patent
Husband et al.

(10) Patent No.: US 12,479,574 B2
(45) Date of Patent: Nov. 25, 2025

(54) AIRCRAFT SURVIVAL KIT GLIDER

(71) Applicant: Rockwell Collins, Inc., Cedar Rapids, IA (US)

(72) Inventors: Casey Husband, Burlington, VT (US); Julia Francesca Santos, Cedar Rapids, IA (US); Grace Elizabeth Cooke, Cedar Rapids, IA (US); Allison Tewksbury, Portland, CT (US); Nathan Van Schaick, Marion, IA (US); Alex James Niner, Wylie, TX (US); John L Hampton, Bradenton, FL (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 94 days.

(21) Appl. No.: 18/458,017

(22) Filed: Aug. 29, 2023

(65) Prior Publication Data
US 2025/0074589 A1 Mar. 6, 2025

(51) Int. Cl.
*B64C 37/02* (2006.01)
*B64D 1/10* (2006.01)
*B64D 1/12* (2006.01)
*B64D 25/10* (2006.01)

(52) U.S. Cl.
CPC ............... *B64C 37/02* (2013.01); *B64D 1/10* (2013.01); *B64D 1/12* (2013.01); *B64D 25/10* (2013.01)

(58) Field of Classification Search
CPC . B64D 1/10; B64D 1/12; B64D 25/10; B64D 37/02; B64U 10/50; F42B 10/02–20; F42B 10/64
See application file for complete search history.

(56) References Cited

U.S. PATENT DOCUMENTS

| | | | |
|---|---|---|---|
| 4,813,634 A * | 3/1989 | Zuck | B64D 25/08 244/89 |
| 10,232,938 B2 | 3/2019 | Yates | |
| 11,453,506 B2 | 9/2022 | Bharucha et al. | |
| 2005/0218260 A1 | 10/2005 | Corder et al. | |
| 2010/0065288 A1 | 3/2010 | Akcasu | |
| 2017/0225755 A1 | 8/2017 | Wilson et al. | |
| 2017/0240276 A1 | 8/2017 | Zilberstein | |
| 2018/0086434 A1 | 3/2018 | Cook et al. | |
| 2022/0001983 A1 | 1/2022 | Groen | |

FOREIGN PATENT DOCUMENTS

WO 8902393 3/1989

OTHER PUBLICATIONS

European Patent Office, European Search Report dated Nov. 11, 2024 in Application No. 24197231.4.

\* cited by examiner

*Primary Examiner* — Timothy D Collins
*Assistant Examiner* — Terri L Filosi
(74) *Attorney, Agent, or Firm* — SNELL & WILMER L.L.P.

(57) ABSTRACT

A supply glider is disclosed herein. The supply glider includes a body having a first end and a second end, the body being configured to be coupled to a host aircraft, a container disposed between the first end and the second end of the body, wings coupled to the body between the first end and the second end, and stabilators coupled to the body adjacent the second end.

5 Claims, 6 Drawing Sheets

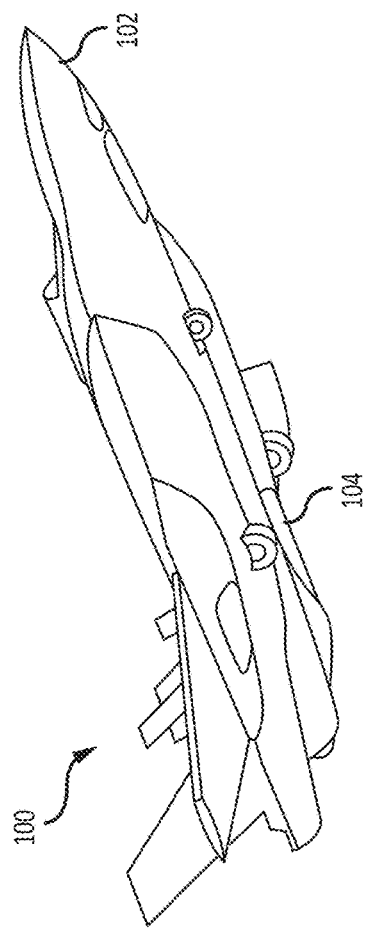
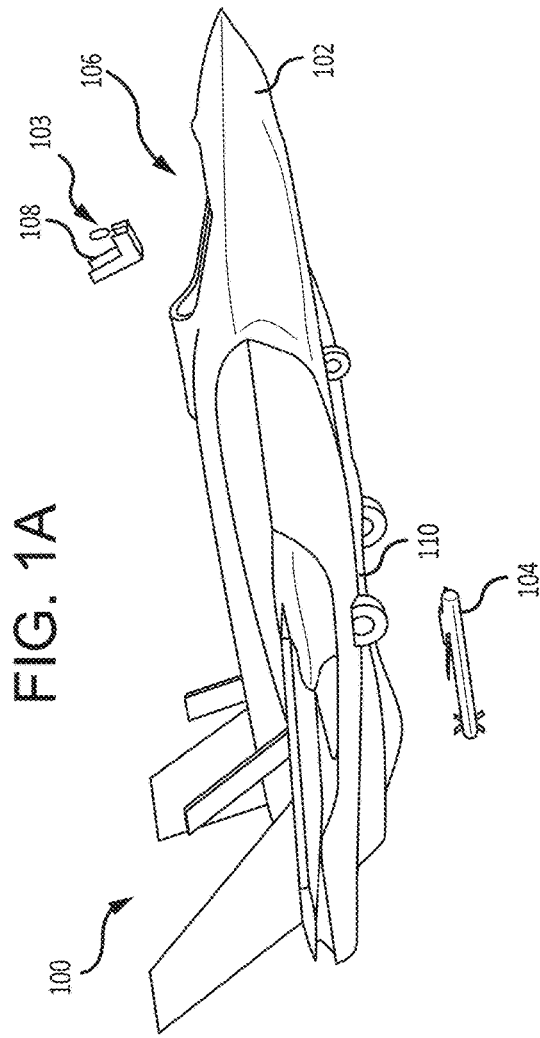
FIG. 1A
FIG. 1B

AIRCRAFT SURVIVAL KIT GLIDER

FIELD

The present disclosure generally relates air-to-surface supply containers and, more particularly, to supply containers that are physically separate from the ejection seat.

BACKGROUND

Various aircraft have one or more ejection seats to displace an occupant from the host aircraft under certain circumstances. Representative components incorporated by an ejection seat may include a main parachute, a drogue parachute, and a survival kit. Survival kits for at least certain ejection seats are stored physically on and/or in the ejection seat. There is limited space available on, or in, the ejection seat and in the cockpit area more generally. Current survival kits may fill the existing limited space available. Design constraints may prevent additional space being allocated to a survival kit in the cockpit area and/or on the ejection seat. Modern zones of conflict may include a greater variety of physical environments, longer distances flown, and may demand larger survival kits, including additional equipment, than current systems are capable of supporting.

Traditional cargo aircraft deliver supplies by air dropping through a large rear door. Cargo aircraft are more detectable and are required to be in close proximity to the delivery point. Bomber, Fighter, or UAV type aircraft are less detectable, fly at higher altitudes, and can deliver at long distance. These aircraft have launching points or bays that have adaptable standardized interfaces to mount and deliver weapons.

SUMMARY

A supply glider is disclosed herein. The supply glider includes a body having a first end and a second end, where the body is configured to be coupled to a host aircraft, a container disposed between the first end and the second end of the body, wings coupled to the body between the first end and the second end, and stabilators coupled to the body adjacent the second end.

In various embodiments, the supply glider further includes a nose coupled to the first end of the body and a tail coupled to the second end of the body. In various embodiments, the tail is configured to detach from the body providing access to the container through the second end of the body. In various embodiments, the nose is configured to detach from the body providing access to the container through the first end of the body.

In various embodiments, the container at least partially defines a bottom portion of the body. The supply glider further includes a seal disposed between the body and the container and a mechanical attachment that is configured to couple to the container to the body. In various embodiments, the wings are retractable and the stabilators are retractable. In various embodiments, the body has a first length and the container has a second length that is about 75% to about 90% of the first length.

Also disclosed herein is a supply glider configured for mounting to an attachment point. The supply glider includes a body defining a container, the container configured to carry supplies, wings coupled to the body, a sensor coupled to the body, and a controller coupled to the sensor, the controller configured to guide the supply glider to a destination.

In various embodiments, the supply glider is configured to be launched from the attachment point in response to a launch signal. In various embodiments, the supply glider further includes stabilators coupled to the body and configured to deploy after a launch of the supply glider. In various embodiments, the supply glider is configured to be launched after an initiation of an ejection seat.

In various embodiments, the controller is further configured to receive a signal from the ejection seat and follow the ejection seat in response to receiving the signal. In various embodiments, the controller is further configured to receive a signal from the sensor, determine the destination in response to receiving the signal, and steer the supply glider to the destination. In various embodiments, the sensor includes one of an altimeter, an air speed sensor, a pressure sensor, a camera, a force sensor, a position sensor, or a vibration sensor.

Also disclosed herein a system including an ejection seat disposed in a cockpit of a host aircraft, a supply glider coupled to the host aircraft, the supply glider including a body,
  a container detachably coupled to the body, wings coupled to the body, a sensor disposed in the body, and a processor disposed in the body and operatively coupled to the sensor, and a memory operatively coupled to the processor, the memory comprising instructions stored thereon that, when executed by the processor, cause the processor to receive a first signal from the sensor, and modify a flight path of the supply glider based at least in part on the received signal.

In various embodiments, the supply glider further comprising a communication module coupled to the processor, wherein the instructions, when executed by the processor, further cause the processor to receive a communication from the communication module, the communication indicating flight information of the ejection seat and control the flight path of the supply glider to follow the ejection seat based at least in part on the received communication. In various embodiments, the system further includes a launch controller disposed in the cockpit and a hardpoint mount disposed on the host aircraft, wherein the supply glider is configured to couple to the hardpoint mount and be deployed from the hardpoint mount in response to a launch signal from the launch controller.

In various embodiments, the system further includes an ejection handle disposed in the cockpit and adjacent the ejection seat and a bay disposed in the host aircraft, the bay configured to store the supply glider and deploy the supply glider in response to an ejection signal from the ejection handle. In various embodiments, the instructions, when executed by the processor, further cause the processor to identify a target destination, receive a second signal from the sensor, and modify the flight path based at least in part on the target destination and the second signal. In various embodiments, the supply glider further including a seal disposed between the body and the container and a plurality of mechanical attachments coupled to the body and configured to secure the container to the body.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 1A illustrates a supply glider coupled to an underside of a host aircraft, in accordance with various embodiments.

FIG. 1B illustrates a supply glider being deployed from an underside of a host aircraft, in accordance with various embodiments.

DETAILED DESCRIPTION

Figure 2:
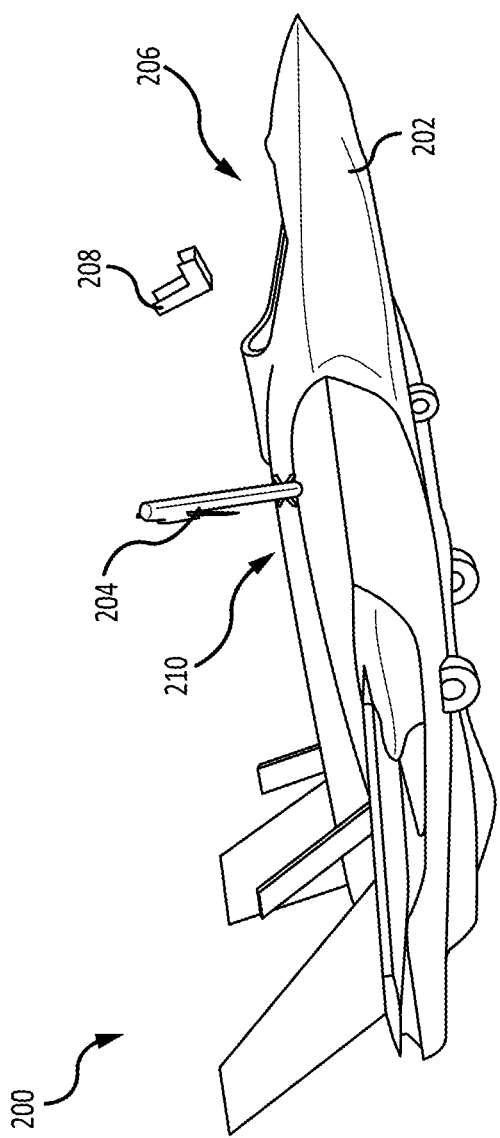
FIG. 2 illustrates a supply glider being deployed from a compartment in a host aircraft, in accordance with various embodiments.
Figure 2:
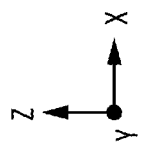

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a survival kit system that may be used during ejection from a host aircraft, for resupply of distant personnel, and/or for search and rescue missions, among others. In various embodiments, the survival kit system may include a supply glider. In various embodiments, the supply glider may include a steering mechanism, a container, and a guidance computer that can be mounted in any location of an airframe. In various embodiments, the supply glider may be launched from the host aircraft close in time to deployment of an ejection seat of the host aircraft. In various embodiments, the supply glider may be coupled to a hardpoint on the host aircraft. In various embodiments, the supply glider may be mounted in an integrated mount (e.g., internal to the host aircraft).

In various embodiments, shortly after launch, the supply glider may deploy one or more mechanisms for steering, including wings, stabilizers, stabilators, and/or steerable parachutes. In various embodiments, the supply glider may include an integrated guidance computer and systems to guide the supply glider. In various embodiments, the supply glider may track the ejection seat. In various embodiments, the supply glider may communicate electronically (e.g., wireless communication) with the aircrew and/or the ejection seat. In various embodiments, the supply glider may land a safe distance away from the aircrew (e.g., about 100 feet (about 30.5 meters) away). In various embodiments, the supply glider may include a container that holds the survival kit.

In various embodiments, the supply glider may be used similar to other components launched from aircraft hardpoints. In various embodiments, the supply glider may increase the size and amount of survival equipment for aircrew during an ejection. In various embodiments, the supply glider may be used to provide survival gear and/or supplies to personnel in a remote zone of conflict. In various embodiments, the supply glider may be used to provide survival gear and/or supplies for remote search and rescue missions. The supply glider, in various embodiments, may expand operational capabilities. In various embodiments, the supply glider may be difficult to detect due to no engine noise, a low-observable profile and small size, and a low-observable flight path.

Referring now to FIGS. 1A and 1B, a survival kit deployment system 100 is illustrated, in accordance with various embodiments. Survival kit deployment system 100 includes a host aircraft 102 and a supply glider 104. Aircraft 102 includes a cockpit 106, one or more ejection seats 108 located within cockpit 106, and one or more hardpoint mounts 110. Ejection seat 108 is configured to protect an aircrew member and to eject from aircraft 102 in response to an ejection signal. In various embodiments, aircraft 102 may further include a bay or other mounting point on aircraft 102. In various embodiments, aircraft 102 may be any number of arial vehicles including a jet, a bomber, a transport, an unmanned arial vehicle, a helicopter, or drone, among other aircraft including one or more hardpoint mounts.

Supply glider 104 may be launched from aircraft 102, and more specifically from hardpoint mount 110. In various embodiments, supply glider 104 may be launched in response to an ejection signal that is activated by an ejection handle 103. In various embodiments, supply glider 104 may be launched simultaneously with ejection seat 108. In various embodiments, supply glider 104 may be launched a short time after ejection seat 108, such as about 0.1 seconds to about 10 seconds, and more specifically, about 0.5 to about 2 seconds after ejection seat 108 is launched. In various embodiments, supply glider 104 may be launched in response to a launch signal from a launch controller that is activated by an aircrew member. In various embodiments, the launch signal may be an electronic signal. In various embodiments, the launch signal may be a mechanical actuation.

After launch, supply glider 104 may deploy steering mechanisms including wings, stabilizers, stabilators, and/or steerable parachutes. In various embodiments, supply glider 104 may include one or more sensors and one or more controller operably coupled to the one or more sensors. The one or more controllers may be configured to guide supply glider 104 to a destination. In various embodiments, the destination may be a pre-determined point. In various embodiments, the destination may be determined by the onboard sensors. In various embodiments, supply glider 104 may be configured to follow ejection seat 108 at a safe distance. In various embodiments, the safe distance may be about 50 feet (about 15.2 meters) to about 1,000 feet (about 305 meters), and more specifically, about 200 feet (about 61 meters) to about 500 feet (about 152 meters). Personnel on the ground may retrieve the contents of supply glider 104 from an integral container after supply glider 104 lands.

Referring now to FIG. 2, a survival kit deployment system 200 is illustrated, in accordance with various embodiments. Survival kit deployment system 200 includes a host aircraft 202 and a supply glider 204. Aircraft 202 includes a cockpit 206, one or more ejection seats 208 located within cockpit 206, and one or more bays 210. Ejection seat 208 is configured to protect an aircrew member and to eject from aircraft 202 in response to an ejection signal. In various embodiments, aircraft 202 may be any number of arial vehicles including a jet, a bomber, a transport, an unmanned arial vehicle, a helicopter, or drone, among other aircraft including one or more bays. In various embodiments, bay 210 may be located aft (e.g., in the negative x-direction) of cockpit 206. In various embodiments, bay 210 may include a door configured to secure and protect supply glider 204. In various embodiments, bay 210 may be located any number of locations within aircraft 202. That is, aircraft 202 may be designed, either during initial design or during a redesign, to incorporate bay 210 in aircraft 202.

Supply glider 204 may be launched from aircraft 202, and more specifically from bay 210. In various embodiments, supply glider 204 may be launched in response to an ejection signal. In various embodiments, supply glider 204 may be launched simultaneously with ejection seat 208. In various embodiments, supply glider 204 may be launched a short time after ejection seat 208, such as about 0.1 seconds to about 10 seconds, and more specifically, about 0.5 to about 2 seconds after ejection seat 208 is launched. In various embodiments, supply glider 204 may be launched in response to a launch signal from an aircrew member.

After launch, supply glider 204 may deploy steering mechanisms including wings, stabilizers, stabilators, and/or steerable parachutes. In various embodiments, supply glider 204 may include one or more sensors and one or more controller operably coupled to the one or more sensors. The one or more controllers may be configured to guide supply glider 204 to a destination. In various embodiments, the destination may be a pre-determined point. In various embodiments, the destination may be determined by the onboard sensors. In various embodiments, supply glider 204 may be configured to follow ejection seat 208 at a safe distance. In various embodiments, the safe distance may be about 50 feet (about 15.2 meters) to about 1,000 feet (about 305 meters), and more specifically, about 200 feet (about 61 meters) to about 500 feet (about 152 meters). Personnel on the ground may retrieve the contents of supply glider 204 from an integral container after supply glider 204 lands. In various embodiments, the launch signal may be an electronic signal. In various embodiments, the launch signal may be a mechanical actuation.

Figure 3A:
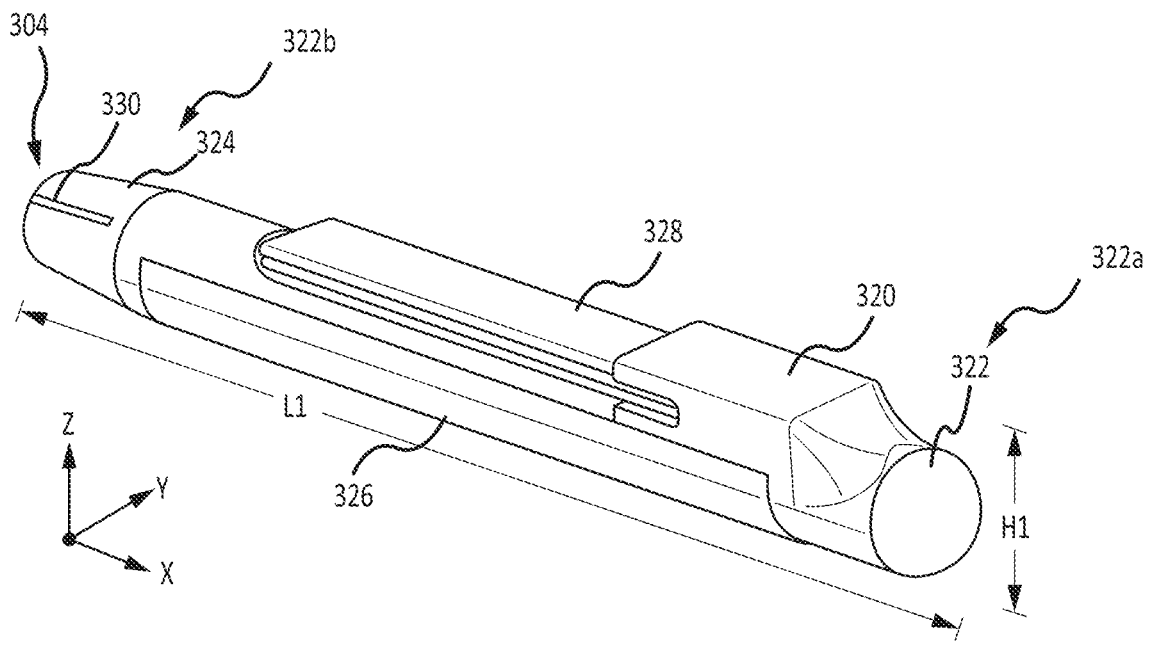
FIGS. 3A, 3B, and 3C illustrate a supply glider that is deployable from a host aircraft, in accordance with various embodiments.
Figure 3B:
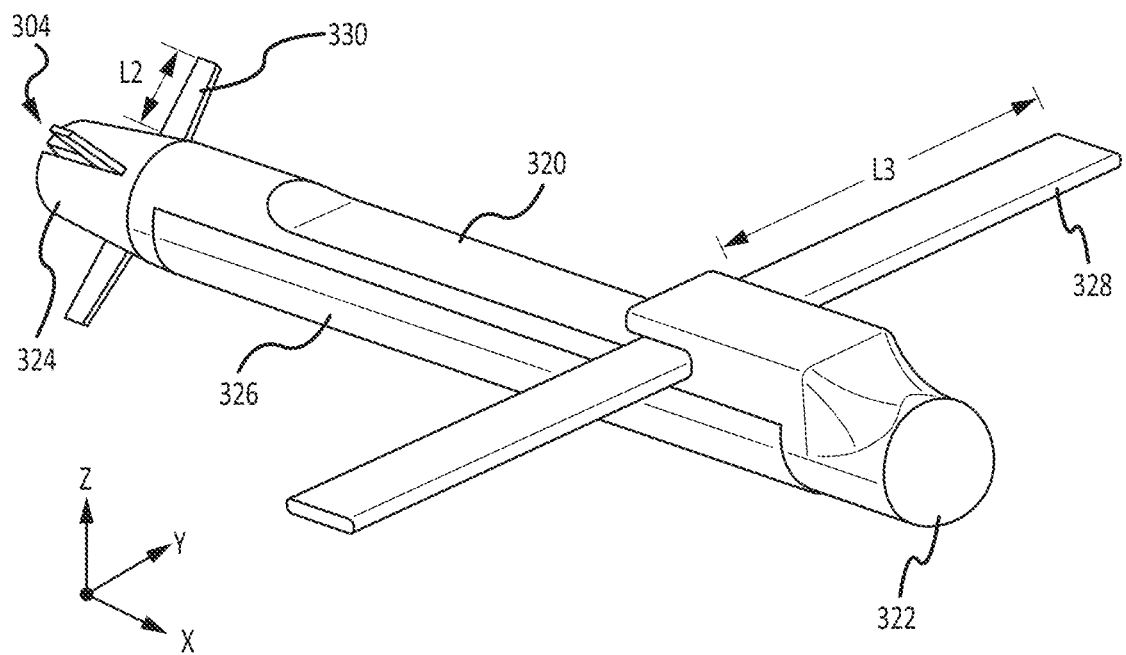

Referring now to FIGS. 3A-3B, a supply glider 304 for carrying survival gear and/or supplies is illustrated, in accordance with various embodiments. Supply glider 304 includes a body 320, a nose 322, a tail 324, a container 326, wings 328, and stabilators 330. In various embodiments, supply glider 304 may further include stabilizers and/or steerable parachutes. In various embodiments, supply glider 304 may further include one or more sensors, one or more controllers, and/or one or more communication modules.

Body 320 is coupled to nose 322 at a first end 322$a$ (e.g., the positive x-direction) and to tail 324 at a second end 322$b$ (e.g., the negative x-direction). In various embodiments, body 320, nose 322, and tail 324 may be a single, monolithic construction. In various embodiments, body 320, nose 322, and tail 324 may be separate components that are joined together (e.g., welded, bolts, etc.). Body 320, including nose 322 and tail 324, has a length L1 and a height H1. In various embodiments, length L1 may be about 35 inches (about 88.9 centimeters) to about 105 inches (about 267 centimeters), and more specifically, about 50 inches (about 127 centimeters) to about 85 inches (about 216 centimeters). In various embodiments, height H1 may be about 3 inches (about 7.62 centimeters) to about 11 inches (about 27.9 centimeters), and more specifically, about 5 inches (about 12.7 centimeters) to about 9 inches (about 22.9 centimeters). In various embodiments, length L1 height H1 may be varied depending on the payload weight, desired travel distance, aircraft type, or operational environment, among other considerations.

Nose 322 is coupled to a forward portion (e.g., in the positive x-direction) of body 320. Nose 322 may, in various embodiments, may be rounded, blunt, conical, frustoconical, or elongated in shape, among other shapes and configurations. In various embodiments, nose 322 may house one or more sensors, one or more controllers, and/or one or more communication modules. In various embodiments, the one or more sensors, one or more controller, and/or one or more communication modules may be mounted at any location within body 320.

In various embodiments, the one or more sensors may include an altimeter, an air speed sensor, a pressure sensor, a camera, a force sensor, a position sensor (e.g., global position satellite (GPS) system), or a vibration sensor, among others. In various embodiments, the one or more communication modules may include IEEE 802.15.1 ("Bluetooth"), IEEE 802.15.4 ("Zigbec"), IEEE 802.11 ("Wi-Fi"), cellular (e.g., 3G, 4G, 5G, etc.), satellite, or other radio frequency (RF) modules (e.g., frequency modulation (FM), amplitude modulation, etc.), among others.

Tail 324 is coupled to an aft portion (e.g., in the negative x-direction) of body 320. Tail 324 houses stabilators 330. In various embodiments, tail 324 may be rounded, blunt, conical, frustoconical, or elongated in shape.

Wings 328 may be retractable, in various embodiments. That is, wings 328 are configured to be stored and transported in a retracted state, as illustrated in FIG. 3A, and to move to an extended state in response to being deployed, as illustrated in FIG. 3B. In various embodiments, wings 328 may be a single component or multiple separate components. In various embodiments, a wingspan of wings 328 may be about 50% to about 100% of length L1, and more specifically, about 75% to about 90%. In various embodiments, each separate wing of wings 328 has a length L3 that may be about 25% to about 50% of length L1, and more specifically, about 35% to about 45% of length L1. In various embodiments, wings 328 may be implemented as simple folding wings that break and articulate, or fold, upward (e.g., in the positive z-direction) or that fold downward (e.g., in the negative z-direction). In various embodiments, wings 328 may be implemented as aftward folding wings that break and articulate, or fold, aftward (e.g., in the negative x-direction). In various embodiments, wings 328 may include multiple articulating points. In various embodiments, wings 328 may be implemented as over-swept wings that sweep aftward (e.g., in the negative x-direction), either partially or completely, for storage, as illustrated in FIGS. 3A and 3B. In various embodiments, wings 328 may be implemented as a single wing that rotates about a single pivot point from a stored position to a deployed position.

Stabilators 330, in various embodiments, may be retractable. Each stabilator 330 may have a length L2. Each stabilator 330 may be coupled to tail 324 at a single point and be configured to retract for storage, as illustrated in FIG. 3A, and to extend in response to being deployed, as illustrated in FIG. 3B. In various embodiments, each stabilator 330 may be in line with body 320 (e.g., along the x-axis) when stored. In various embodiments, each stabilator 330 may be orthogonal to body 320 (e.g., orthogonal to the x-axis) when fully deployed. In various embodiments, each stabilator 330 may be deployed to a position between the stored position and the fully deployed position.

Container 326 is coupled to body 320, and more specifically, is detachably coupled to body 320. That is, container 326 is configured to be attached to body 320 and to be detached from body 320. In various embodiments, container 326 may be configured to detachably couple to a top portion of body 320 (e.g., in the positive z-direction) and thereby form a bottom portion of body 320 (e.g., in the negative z-direction). In various embodiments, body 320 and/or container 326 may include one or more gaskets, seals, or other components to seal the connection between container 326 and body 320. In various embodiments, container 326 may be detachably coupled to body 320 using mechanical attachments such as bolt latches, spring latches, cam latches, compression latches, slam latches, or rotary latches, among others. In various embodiments, container 326 may include one or more locks to secure container 326 to body 320. In various embodiments, the mechanical attachments and/or locks may be configured to be operated and/or opened without the use of tools. In various embodiments, the mechanical attachments and/or locks may be configured to be operated using tools, keys, and/or electronic devices. In various embodiments, the body of the mechanical attachment may be coupled to body 320. In various embodiments, the body of the mechanical attachment may be coupled to container 326.

In various embodiments, a seal (e.g., an O-ring) disposed between body 320 and container 326 to provide a weather seal. In various embodiments, body 320 and container 326 may include a tongue and groove configuration to facilitate the connection between body 320 and container 326. In various embodiments, container 326 may slide vertically (e.g., in the positive direction) onto body 320. In various embodiments, container 326 may slide horizontally (e.g., in the positive or negative y-direction) onto body 320. In various embodiments, container 326 may be press fit onto body 320. That is, there may be little to no space between container 326 and body 320 and container 326 is secured to body 320 using one or more mechanical attachments and/or locks as described above. In various embodiments, body 320 may act as container 326 itself.

Container 326 has a compartment 332, a length L4, a width W1, and a height H2. In various embodiments, length L4 may be about 50% to about 90% of length L1, and more specifically, about 75% to about 85% of length L1. In various embodiments, width W1, at the widest point of container 326, may be about equal to height H1. In various embodiments, height H2 may be about 50% to about 90% of height H1, and more specifically, about 60% to about 80% of height H1. In various embodiments, compartment 332 may extend from a first end 326a of container 326 (e.g., in the negative x-direction) to a second end 326b of container 326 (e.g., in the positive x-direction), from a first side 326c of container 326 (e.g., in the negative y-direction) to a second side 326d of container 326 (e.g., in the positive y-direction), and from a bottom 326e of container 326 (e.g., in the negative z-direction) to an open top 326f of container 326 (e.g., in the positive z-direction).

Container 326 may be loaded with but not limited to medical supplies, clothing, food, water, shelter, cooking/drinking devices, strobes, communication devices, small arms, ammunition, and/or explosives, among other items. In various embodiments, container 326 may further include dividers to separate cargo within container 326 to minimize disturbance to the flight of supply glider 304. Bottom 326e, in various embodiments, may be reinforced to provide protection for container 326 from rough terrain during landing of supply glider 304. In various embodiments, first end 326a, second end 326b, first side 326c, and/or second side 326d may be reinforced to provide protection for container 326 form rough terrain during landing of supply glider 304. That is, the walls of container 326 may be thicker in some areas than in other areas, there may be additional materials applied to the walls of container 326, and/or container 326 may be manufactured from multiple different materials.

Supply glider 304 may, in various embodiments, be manufactured using low-visibility materials that are low visibility visually, electronically, or a combination of the two. The size of supply glider 304 may, in various embodiments, reduce the visibility of supply glider 304 visually, electronically, or both. In various embodiments, and in different configurations, supply glider 304 may be able to glide, unassisted, about 100 miles (about 161 kilometers) or more. That is, in various embodiments, supply glider 304 does not include an engine and may glide from launch to landing about 100 miles (about 161 kilometers) or more. This provides expanded options for use not only in conjunction with an ejection seat deployment but also in sending supplies long distance over rough terrain for search and rescue operations or into disputed zones or zones of conflict. In various embodiments, supply glider 304 may include an engine or other form of propulsion for maneuverability or extended range.

Figure 3C:
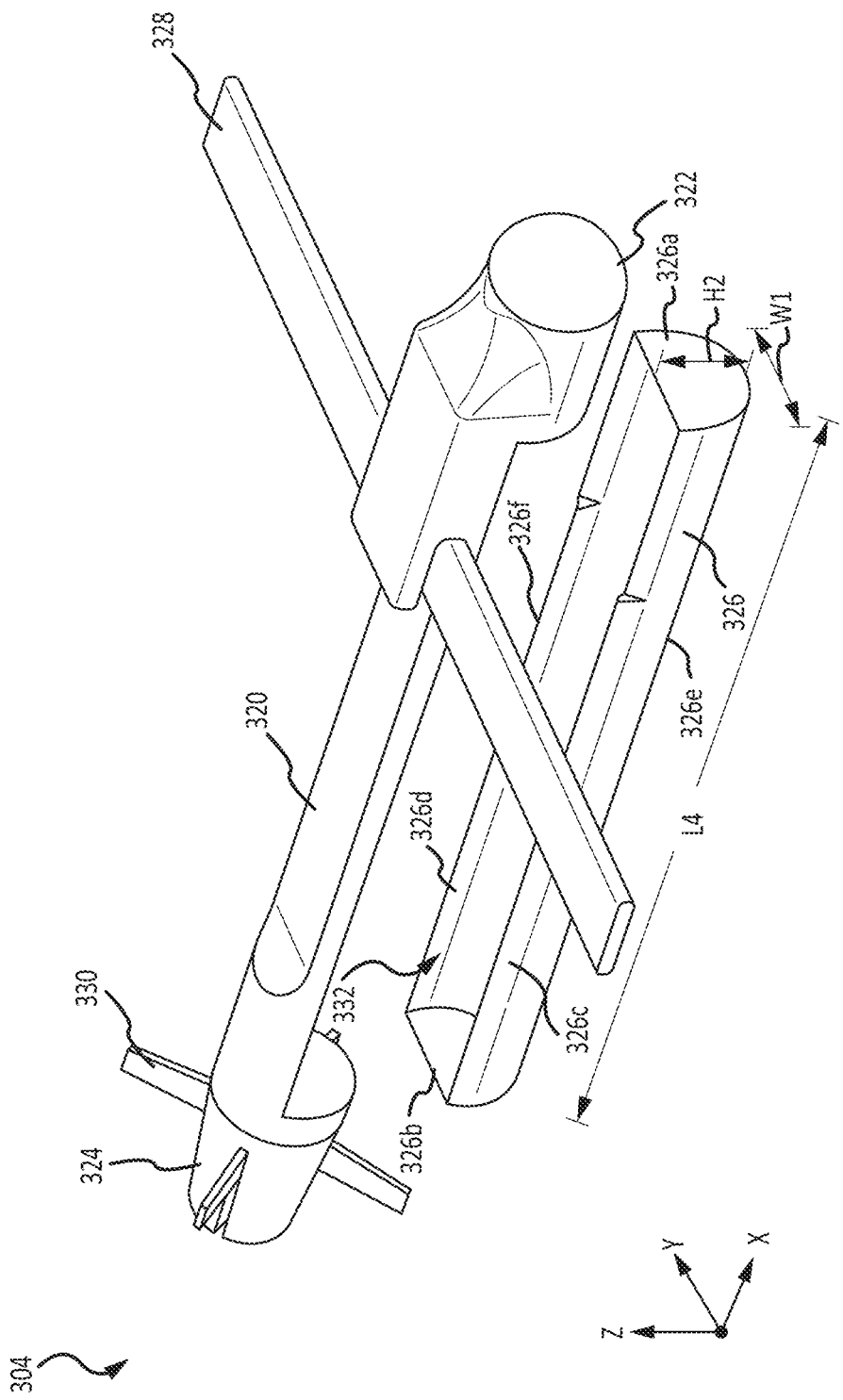
Figure 4:
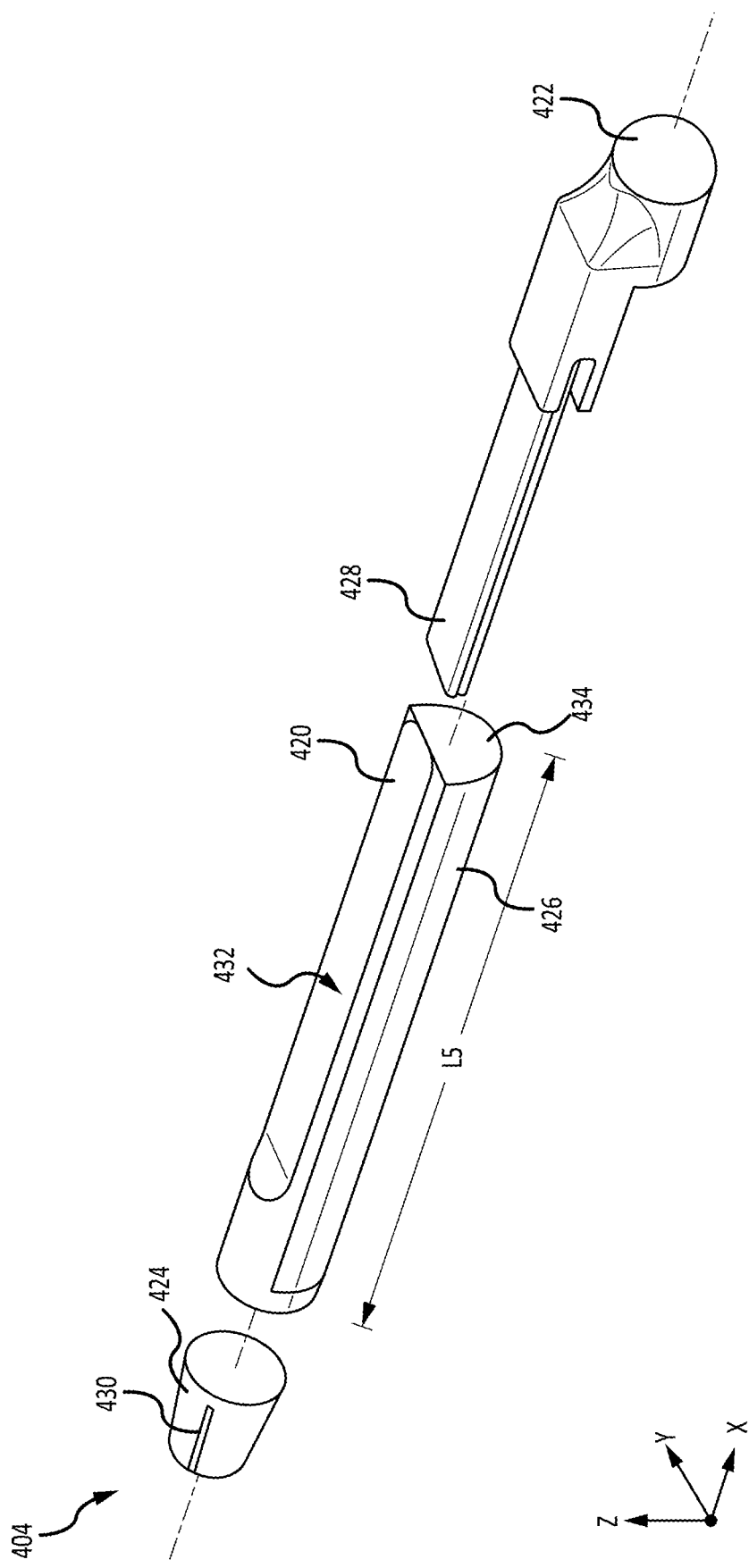
FIG. 4 illustrates a supply glider that is deployable from a host aircraft, in accordance with various embodiments.

Referring now to FIG. 4, a supply glider 404 for carrying survival gear and/or supplies is illustrated, in accordance with various embodiments. Supply glider 404 includes similar components to those described above with respect to supply glider 304 in FIGS. 3A-3C, including a body 420, a nose 422, a tail 424, a container 426, wings 428, stabilators 430, and compartment 432, descriptions of which may not be repeated below. Supply glider 404 further includes an access 434 and container 426 has a length L5. In various embodiments, length L5 may be about 50% to about 95% of length L1 (i.e., the length of body 420, nose 422, and tail 424 as described above), and more specifically, about 80% to about 90% of length L1.

In various embodiments, access 434 may be located at a front end of container 426 (e.g., in the positive x-direction) adjacent nose 422. In various embodiments, access 434 may be located at a rear end of container 426 (e.g., in the negative x-direction) adjacent tail 424. In various embodiments, access 434 may be located along a top portion of container 426 (e.g., in the positive z-direction). In various embodiments, access 434 may include a door, a hatch, a covering, or a removable stopper, among others, to secure the contents of container 426. In various embodiments, access 434 may be an opening into container 426 that is secured by nose 422 and/or tail 424.

Nose 422 and/or tail 424 may be removably coupled to body 420. This allows body 420 to define container 426 so that compartment 432 may be larger than compartment 332 described above in FIGS. 3A-3C. In various embodiments, this may allow body 420 to be smaller, or shorter, than body 320 without reducing the storage capacity of container 426 as compared to container 326. In various embodiments, nose 422 and/or tail 424 may be threaded to be rotatably removed from body 420. In various embodiments, body 420 may act as compartment 432. In various embodiments, nose 422 may be removed to access container 426. In various embodiments, container 426 may slide out of body 420 (e.g., in the positive x-direction). In various embodiments, tail 424 may be removed to access container 426. In various embodiments, container 426 may slide out of body 420 (e.g., in the negative x-direction). In various embodiments, nose 422 and/or tail 424 may slide onto body 420 and be secured using one or more mechanical attachments including latches, buttons, hooks, thumb bolts, or press fit couplings, among others. In various embodiments, wings 428 may be coupled to nose 422 and removable from body 420. In various embodiments, wings 428 may be coupled to body 420 and therefore not removable with nose 422. It will be appreciated that other configurations of supply glider 404 are possible and considered within the scope of this disclosure.

Figure 5:
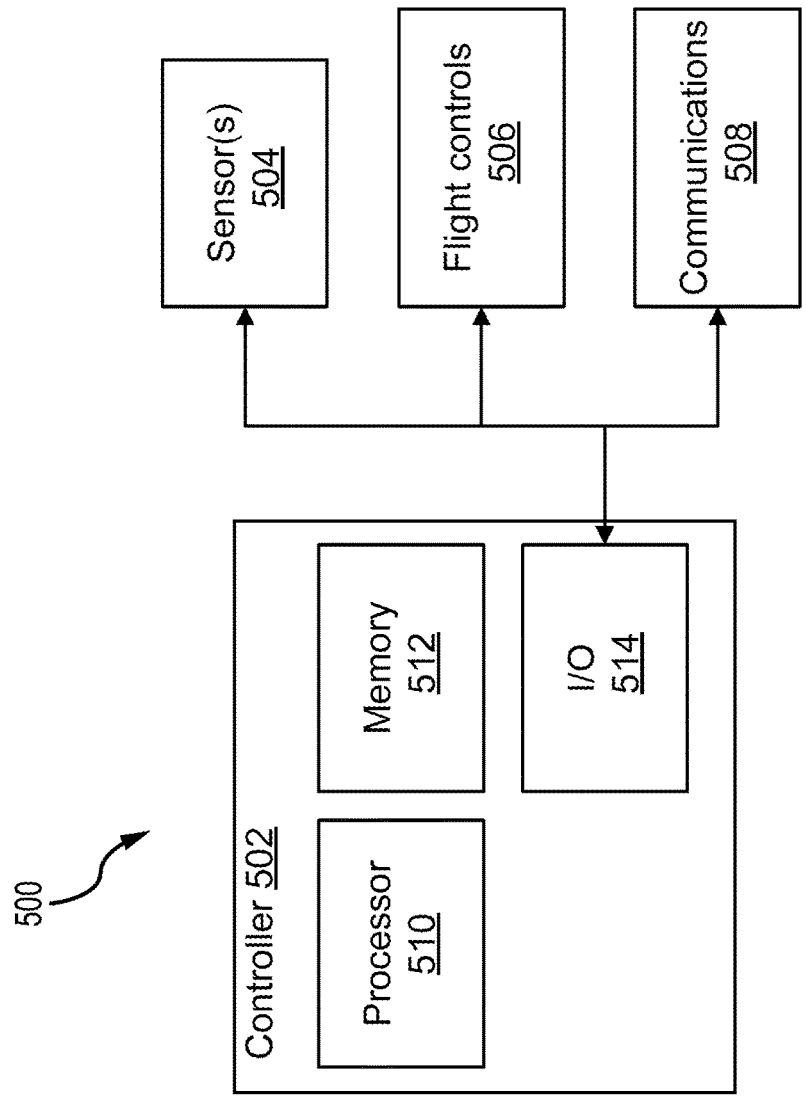
FIG. 5 illustrates a system for controlling the flight of a supply glider, in accordance with various embodiments.

Referring now to FIG. 5, a control system 500 for a supply glider is illustrated, in accordance with various embodiments. In various embodiments, control system 500 may be used by supply glider 104, 204, 304, or 404 for navigation, control, and communication. Control system 500 includes a controller 502, a sensor 504, a flight control 506, and a communication module 508. In various embodiments, controller 502, sensor 504, flight control 506, and/or communication module 508 may be located in a nose (e.g., nose 322, 422) of the supply glider. In various embodiments, controller 502, sensor 504, flight control 506, and/or communication module 508 may additionally, or alternatively, be located in a body (e.g., body 320, 420) and/or a tail (e.g., tail 324, 424) of the supply glider.

Controller 502 includes a processor 510, a memory 512, and an input/output (I/O) 514. Processor 510 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 512 may comprise memory to store data, executable instructions, system program instructions, and/or controller instructions to implement the control logic of processor 510. I/O 514 may include one or more ports configured to communicate with sensor 504, flight control 506, and/or communication module 508. In various embodiments, I/O 514 communicate using a controller area network (CAN bus), an inter-integrated circuit (I2C) bus, a universal serial bus (USB), an IEEE 802.3 (ethernet) network, or a serial communications interface, among others.

Sensor 504 may comprise multiple sensors that may be located adjacent to each other or spread out through the body of the supply glider. In various embodiments, sensor 504 may include one or more of an altimeter, an air speed sensor, a pressure sensor, a camera, a force sensor, a position sensor (e.g., global position satellite (GPS) system), or a vibration sensor, among others.

Flight control 506 may comprise multiple different flight controls including electric or mechanical connections to wings (e.g., wings 328, 428) and/or stabilators (e.g., stabilator 330, 430) of the supply glider. In various embodiments, flight control 506 may provide complex controls to guide the supply glider to a specific target zone and/or for tracking an ejection seat. In various embodiments, flight control 506 may provide simple controls for maintaining the glide path of the supply glider for as long as possible.

Communication module 508 may comprise multiple different communication modules. In various embodiments, communication module 508 may include IEEE 802.15.1 ("Bluetooth"), IEEE 802.15.4 ("Zigbee"), IEEE 802.11 ("Wi-Fi"), cellular (e.g., 3G, 4G, 5G, etc.), satellite, or other radio frequency (RF) modules (e.g., frequency modulation (FM), amplitude modulation, etc.), among others.

In various embodiments, controller 502 may be configured to activate in response to a signal. In various embodiments, the signal may be an ejection initiation. In various embodiments, the signal may be triggered by a pilot. In various embodiments, controller 502 may be online during a duration of a flight. Controller 502, and more specifically processor 510, may execute code that communicates with sensor 504 to identify a flight path and/or corrections to the flight path. In various embodiments, processor 510 may identify a target destination based on sensor 504. In various embodiments, the target destination may be an ejection seat, designated ground personnel, or a specific geographic location. In various embodiments, processor 510 may receive the target destination from communication module 508. The target destination be sent by satellite communication, radio communication, or infra-red (IR) communication, among others. Processor 510 may further execute code that communicates with flight control 506 to execute the identified flight path. In various embodiments, processor 510 may receive feedback from sensor 504 and provide updated commands to flight control 506 in response to the feedback.

In various embodiments, controller 502, and more specifically processor 510, may execute code that uses communication module 508 to communicate with an ejection seat to determine a status of the ejection seat including location, speed, and altitude, among others. Processor 510 may execute code that identifies a flight path of the supply glider to maintain the supply glider a safe distance from the ejection seat (e.g., about 100 feet (about 30.5 meters)). Accordingly, control system 500 is configured to receive sensor input, make flight course adjustments, and to communicate with other devices (e.g., the ejection seat).

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system, comprising:
   a host aircraft comprising a launch controller;
   an ejection seat disposed in a cockpit of the host aircraft; the ejection seat configured to eject from the aircraft in response to an ejection signal;
   a supply glider coupled to the host aircraft separately from the election seat,
   wherein the supply glider is configured to launch from the host aircraft in response to the ejection signal or the launch controller,
   the supply glider including:
   a body;
   a container detachably coupled to the body;
   wings coupled to the body;
   a sensor disposed in the body; and
   a processor disposed in the body and operatively coupled to the sensor; and
   the processor configured to:
   receive a first signal from the sensor;
   modify a flight path of the supply glider based at least in part on the received first signal;
   identify a target destination, wherein the target destination is the ejection seat;
   receive a second signal from the sensor;
   modify the flight path based on the target destination and the second signal; and
   a communication module coupled to the processor, the processor further configured to:
   receive a communication from the communication module, the communication indicating flight information of the ejection seat; and
   control the flight path of the supply glider to follow the ejection seat based at least in part on the received communication at a following distance.

2. The system of claim 1, wherein the following distance of is between 50-1,000 feet.

3. The system of claim 1, further comprising:
   the launch controller disposed in the cockpit; and
   a hardpoint mount disposed on an underside of a fuselage of the host aircraft, wherein the supply glider is configured to couple to the hardpoint mount and be deployed from the hardpoint mount in response to a launch signal from the launch controller.

4. The system of claim 1, further comprising:
   an ejection handle disposed in the cockpit and adjacent the ejection seat; and
   a bay disposed in the host aircraft, the bay being a space aft of the cockpit configured to store the supply glider and deploy the supply glider in response to the ejection signal from the ejection handle.

5. The system of claim 1, the supply glider further comprising:
   a seal disposed between the body and the container; and
   a plurality of mechanical attachments coupled to the body and configured to secure the container to the body.

\* \* \* \* \*